(12) United States Patent
Wang et al.

(10) Patent No.: US 10,877,460 B2
(45) Date of Patent: Dec. 29, 2020

(54) SECURITY CHECK INSTRUMENT MOTION CONTROL SYSTEM

(71) Applicants: CHINA COMMUNICATION TECHNOLOGY CO., LTD., Shenzhen (CN); SHENZHEN VICTOOTH TERAHERTZ TECHNOLOGY CO., LTD., Shenzhen (CN)

(72) Inventors: Rong Wang, Shenzhen (CN); Chunchao Qi, Shenzhen (CN); Xiongwei Huang, Shenzhen (CN); Guangsheng Wu, Shenzhen (CN); Shukai Zhao, Shenzhen (CN); Qing Ding, Shenzhen (CN)

(73) Assignee: CHINA COMMUNICATION TECHNOLOGY CO., LTD., Shenzhen (CN)

( * ) Notice: Subject to any disclaimer, the term of this patent is extended or adjusted under 35 U.S.C. 154(b) by 165 days.

(21) Appl. No.: 16/319,160

(22) PCT Filed: Jul. 13, 2017

(86) PCT No.: PCT/CN2017/092831
§ 371 (c)(1),
(2) Date: May 9, 2019

(87) PCT Pub. No.: WO2018/014782
PCT Pub. Date: Jan. 25, 2018

(65) Prior Publication Data
US 2019/0258220 A1  Aug. 22, 2019

(30) Foreign Application Priority Data
Jul. 21, 2016 (CN) ............. 2016 1 0587383

(51) Int. Cl.
  *G05B 19/4061* (2006.01)
  *G05B 19/414* (2006.01)
(52) U.S. Cl.
  CPC ....... *G05B 19/4061* (2013.01); *G05B 19/414* (2013.01); *G05B 2219/40339* (2013.01)
(58) Field of Classification Search
  CPC .............. G05B 19/4061; G05B 19/414; G05B 2219/40339; G01V 8/005; G01V 3/12
  See application file for complete search history.

(56) References Cited

U.S. PATENT DOCUMENTS 5,366,042 A    11/1994  Wilks et al.
10,254,397 B2 * 4/2019  Kayano ................. G01V 8/005
(Continued)

FOREIGN PATENT DOCUMENTS

CN   101472783   5/2010
CN   102426361   4/2012
(Continued)

*Primary Examiner* — Ramesh B Patel
(74) *Attorney, Agent, or Firm* — Jason P. Mueller (57) ABSTRACT

A security check instrument motion control system includes an FPGA control chip that receives motion instructions, comprising angle, direction, speed and the like, from an upper computer via an upper computer communication module, realizes quick control to a rotation motion module, and controls a motion state of the rotation motion module according to real-time motion information of the rotation motion module detected by a positioning detection module. The motion state includes a motion stop state and a normal rotation state. The FPGA control chip detects the working state of each module in the security check instrument motion control system in real time, and once the security check instrument motion control system has a fault, each module can be subjected to debugging, repairing and maintenance respectively. If the positioning detection module detects that (Continued)

the rotation motion module is abnormal, the FPGA control chip controls the rotation motion module to stop moving.

10 Claims, 5 Drawing Sheets

(56) References Cited

U.S. PATENT DOCUMENTS

| | | | | |
|---|---|---|---|---|
| 10,551,490 | B2* | 2/2020 | Qi | G01S 7/03 |
| 2008/0025590 | A1* | 1/2008 | Zellerhoff | A61B 6/541 |
| | | | | 382/131 |
| 2018/0321374 | A1* | 11/2018 | Qi | G01S 13/887 |
| 2018/0329053 | A1* | 11/2018 | Qi | G01S 13/887 |
| 2019/0004171 | A1* | 1/2019 | Qi | G01V 3/12 |
| 2019/0138802 | A1* | 5/2019 | Qi | G06T 7/62 |

FOREIGN PATENT DOCUMENTS

| | | |
|---|---|---|
| CN | 106094734 | 11/2016 |
| CN | 205862211 | 1/2017 |

* cited by examiner

SECURITY CHECK INSTRUMENT MOTION CONTROL SYSTEM

PRIORITY INFORMATION

This application is a national stage entry application under 35 U.S.C. 371 of PCT Patent Application No. PCT/CN2017/092831, filed Jul. 13, 2017, which claims priority to Chinese Patent Application No. 201610587383.6, filed Jul. 21, 2016, the entire contents of each of which are incorporated herein by reference.

BACKGROUND OF THE INVENTION

Technical Field

The present disclosure relates to the technical field of security check instruments, in particular to a security check instrument motion control system.

Description of Related Art

The frequency of millimetre waves ranges from 30 GHz to 300 GHz (the wavelength of the millimetre waves ranges from 1 mm to 10 mm), and in practical engineering application, the low frequency of the millimetre waves is usually decreased to 26 GHz. In the electromagnetic spectrum, the frequency of the millimetre waves is between the frequency of infrared waves and the frequency of microwaves. Compared with infrared waves, the millimetre waves have the capacity to work in all-weather and can also be used in dusty, cloudy, foggy, and other severe environments. Compared with microwaves, the millimetre waves have the typical characteristics of short wavelength, wide frequency band (having a broad application prospect) and the capacity to propagate in the atmosphere. Particularly, the millimetre waves mainly have the following characteristics: the millimetre waves are high in precision and resolution, capable of penetrating through plasma and unlikely to be affected by severe natural environments; millimetre wave systems are small in size and low in weight, millimetre wave circuits have a much smaller size when compared with microwave circuits, and thus, integration of the millimetre wave systems is easier; and with these unique properties, millimetre wave technology has broad application prospects in the fields of nondestructive inspection and security checks.

Millimetre wave imaging mainly includes active millimetre wave imaging and passive millimetre wave imaging. Generally, human body scanning information is obtained through a three-dimensional full imaging technique based on rotational scanning of a cylindrical active millimetre wave array (namely a millimetre wave transmitting and receiving array antenna module), and a programmable logic controller (PLC) control system and a servo motor control scheme are usually used for motion control; however, due to the fact that common PLCs are low in signal processing speed and long in signal delay, the motion and work states of all motors cannot be monitored in real time. Once a fault occurs, maintenance and detection are difficult, making human body security check instruments inconvenient to maintain, repair and debug; and mistaken motions cannot be protected or cannot be comprehensively prevented, and consequentially, potential safety hazards are caused.

BRIEF SUMMARY OF THE INVENTION

In view of this, it is necessary to provide a security check instrument motion control system to solve the problems of complex maintenance, inconvenient debugging and poor safety performance.

The security check instrument motion control system comprises an upper computer communication module, a main controller, a rotation motion module, a trigger module, a positioning detection module and a power module, wherein:

the upper computer communication module communicates with an upper computer;

the main controller is connected with the upper computer communication module, the rotation motion module, the trigger module and the positioning detection module respectively, receives motion instructions from the upper computer and drives and controls the rotation motion module to move;

the rotation motion module is mechanically connected with the positioning detection module, and the positioning detection module is used for detecting and judging motion information of the rotation motion module;

the main controller controls a motion state of the rotation motion module according to the motion information and controls the trigger module to acquire human body information through screening, wherein the main controller is an FPGA control chip;

the power module supplies power to each module in the security check instrument motion control system.

In one embodiment, the rotation motion module comprises a driver, a servo motor and a cantilever, wherein:

The driver, the servo motor and the cantilever are sequentially connected, and the driver is used for driving the servo motor to drive the cantilever to rotate.

In one embodiment, the positioning detection module comprises a rotary encoder and a positioning unit, wherein the rotary encoder and the positioning unit are coaxial with the servo motor;

the rotary encoder is used for detecting the rotation angle, direction and speed information of the serve motor in real time;

the positioning unit is used for monitoring the clockwise or anticlockwise rotation of the initial and extreme positions of the servo motor. In one embodiment, the rotary encoder is an incremental encoder with a resolution smaller than or equal to 0.005°.

In one embodiment, the positioning unit comprises a positioning sheet, wherein the positioning sheet comprises a first sector ring, a second sector ring, a third sector ring and a fourth sector ring which are annularly connected in an anticlockwise direction, and circle centers of the first sector ring, the second sector ring, the third sector ring, and the fourth sector ring coincide;

the central angles of the first sector ring, second sector ring, third sector ring and fourth sector ring are respectively a first central angle, a second central angle, a third central angle and a fourth central angle;

the major radii of the first sector ring, second sector ring, third sector ring and fourth sector ring are respectively a first radius, a second radius, a third radius and a fourth radius;

the first central angle is an obtuse angle, the second central angle is an acute angle, the third central angle is a right angle, and the fourth central angle is an obtuse angle;

the first radius, the third radius and the second radius are decreased gradually, and the second radius is equal to the fourth radius.

In one embodiment, the positioning unit further comprises a first protection switch, a second protection switch, a null switch and an intermediate switch;

the null switch is arranged on the midpoint of an arc of the first sector ring, and the distance from the null switch to the circle center is smaller than the first radius and greater than the third radius;

a connecting line between the intermediate switch and the null switch penetrates through the circle center, and the intermediate switch is located at the joint between the third sector ring and the fourth sector ring; the distance from the intermediate switch to the circle center is greater than the second radius and smaller than the third radius;

the first protection switch, the second protection switch and the null switch are located on the same circumference, and a fifth central angle defined by the first protection switch, the circle center and the null switch and a sixth central angle defined by the second protection switch, the circle center and the null switch are equal to the first central angle.

In one embodiment, the first protection switch and the second protection switch are mechanical switches.

In one embodiment, the null switch and the intermediate switch are photoelectric sensor switches.

In one embodiment, the trigger module comprises a digital pulse drive chip connected with the FPGA control chip.

In one embodiment, the upper computer communication module comprises an mbps ethernet port communication chip, the mbps ethernet port communication chip is connected with the upper computer, to be used for communication with the upper computer.

In the security check instrument motion control system, the FPGA control chip receives motion instructions, comprising the angle, direction, speed and the like, from the upper computer via the upper computer communication module, and realizes quick control of the rotation motion module; and meanwhile, the FPGA control chip controls the motion state of the rotation motion module according to the real-time motion information (rotation angle, direction and speed) of the rotation motion module detected by the positioning detection module, wherein the motion state comprises a motion stop state and a normal rotation state. The FPGA control chip can detect the working state of each module in the security check instrument motion control system in real time; and once the security check instrument motion control system has a fault, each module can be subjected to debugging, repairing and maintenance respectively, thereby improving working efficiency. At the same time, if the positioning detection module detects that the rotation motion module is abnormal, the FPGA control chip controls the rotation motion module to stop moving, thereby greatly improving safety of the rotation motion module.

DETAILED DESCRIPTION OF THE INVENTION

For a better understanding of the present disclosure, the present disclosure is more comprehensively described below with reference to the relevant accompanying drawings. Although the accompanying drawings show preferred embodiments of the present disclosure, the present disclosure can be implemented in various other forms without being limited to the embodiments in this specification. On the contrary, the embodiments in this specification are provided for a more thorough and comprehensive understanding of the contents of the present disclosure.

Unless defined otherwise, all technical and scientific terms in this specification have meanings commonly appreciated by those skilled in the technical field of the present disclosure. These terms in this specification are only used to describe the objectives of the specific embodiments of the present disclosure and are not intended to limit the present disclosure. The term 'and/or' in this specification refers to any one or any combinations of one or more relevant items listed.

Figure 1:
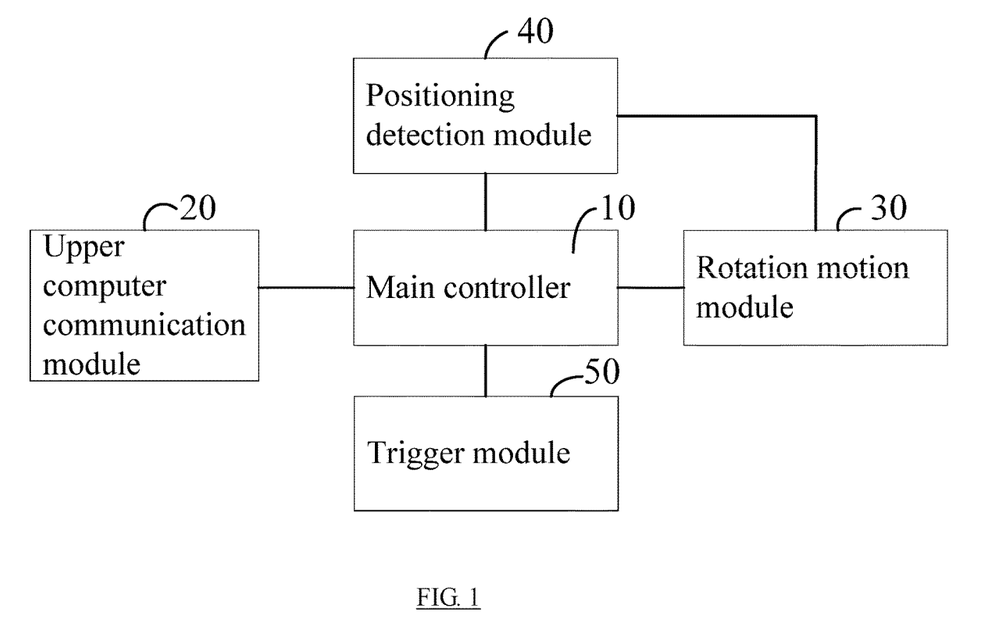
FIG. 1 is a structural frame diagram of a security check instrument motion control system.

FIG. 1 shows a security check instrument motion control system. As shown in FIG. 1, the security check instrument motion control system comprises a main controller 10, an upper computer communication module 20, a rotation motion module 30, a positioning detection module 40, a trigger module 50 and a power module (not shown). The upper computer communication module 20 communicates with an upper computer. The main controller 10 is connected with the upper computer communication module 20, the rotation motion module 30, the positioning detection module 40 and the trigger module 50 respectively, receives motion instructions from the upper computer via the upper computer communication module 20 and drives and controls the rotation motion module 30 to move. The rotation motion module 30 is mechanically connected with the positioning detection module 40, and the positioning detection module 40 is used for detecting and judging motion information of the rotation motion module 30. The main controller 10 controls a motion state of the rotation motion module 30 according to the motion information of the rotation motion module 30 and controls the trigger module 50 to acquire human body information through screening. The power module supplies power to each module in the security check instrument motion control system.

In this embodiment, the controller 10 is a field-programmable gate array (FPGA) control chip, which is developed from a programmable device such as a PLA device, a GAL device or a CPLD device, and is specially applied to semi-customized circuits in the field of Application Specific Integrated Circuits (ASIC), to overcome the drawbacks of customized circuits as well as the number of gate circuits of the original programmable devices being limited. Compared with traditional PLCs, the FPGA control chip has the advantages of high signal processing speed, capability of processing signals in time with low delay, and flexible approach in peripheral communication ports.

The upper computer communication module 20 comprises an mbps ethernet port communication chip used for realizing communication with the upper computer. The FPGA control chip receives motion instructions comprising the angle, direction, speed and the like, from the upper computer via the upper computer communication module 20, and realizes quick control to the rotation of the rotation motion module 30. Meanwhile, the FPGA control chip controls the motion state of the rotation motion module according to the real-time motion information (rotation angle, direction and speed) of the rotation motion module 30 detected by the positioning detection module 40, wherein the motion state comprises a motion stop state and a normal rotation state. The upper computer communication module 20 can also feed the real-time motion information (rotation angle, direction and speed) of the rotation motion module 30 detected by the positioning detection module 40 back to the upper computer.

The FPGA control chip can detect the working state of each module in the security check instrument motion control system in real time; and once the security check instrument motion control system has a fault, each module can be subjected to debugging, repairing and maintenance respectively, thereby improving the working efficiency. At the same time, if the positioning detection module 40 detects that the rotation motion module 30 is abnormal, the FPGA control chip controls the rotation motion module to stop moving, thereby greatly improving safety of the rotation motion module 30.

Figure 2:
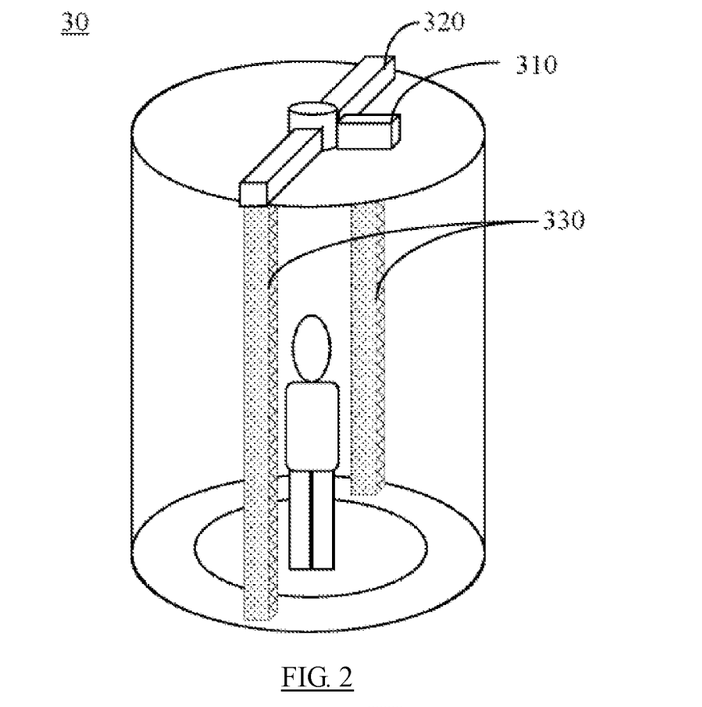
FIG. 2 is a structural view of a rotation motion module in the security check instrument motion control system.

FIG. 2 is a structural view of the rotation motion module in the security check instrument motion control system. As shown in FIG. 2, the rotation motion module 30 comprises a driver 310, a servo motor 320 and a cantilever 330. The driver 310, the servo motor 320 and the cantilever 330 are sequentially connected. The driver 310 is used for driving the servo motor 320 to drive the cantilever 330 to rotate clockwise or anticlockwise by an angle θ, wherein θ is an obtuse angle. In this embodiment, θ is 120°, 135° or 150°, and the rotation angle θ can be set according to the actual requirements and is not limited to the specific ones in this embodiment.

Figure 3:
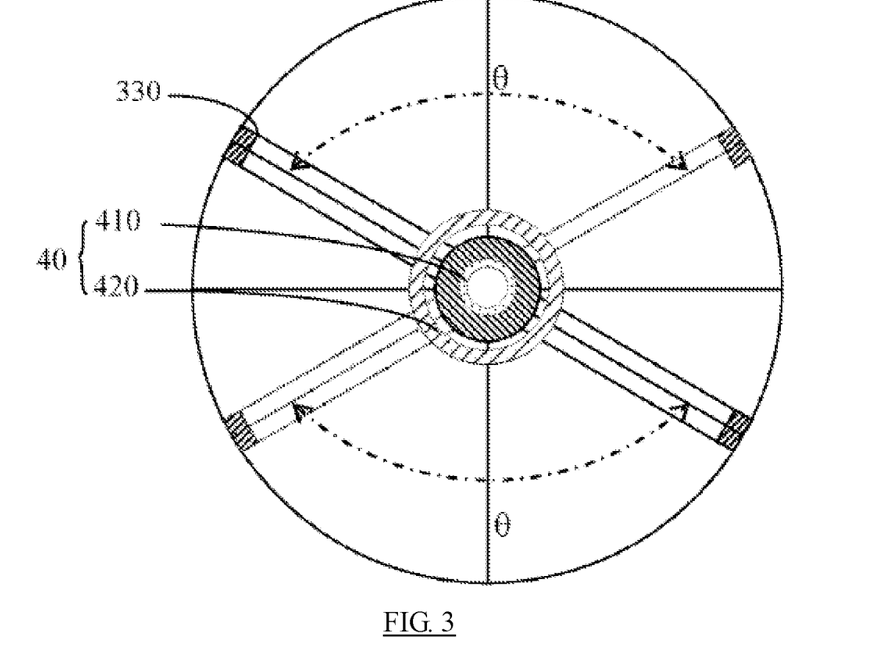
FIG. 3 is a top view of the rotation motion module and a positioning detection module in the security check instrument motion control system.

Referring to FIG. 3, the positioning detection module 40 comprises a rotary encoder 410 and a positioning unit 420, wherein the rotary encoder 410 and the positioning unit 420 are coaxial with the servo motor 320, the rotary encoder 410 is used for detecting the rotation angle, direction and speed information of the servo motor 320 in real time, and the positioning unit 420 is used for monitoring the clockwise or anticlockwise rotation of the initial and extreme positions of the servo motor 320.

In this embodiment, the rotary encoder 410 is an incremental encoder with a resolution smaller than or equal to 0.005°. The incremental rotary encoder 410 is used for converting the displacement into a periodic electric signal and then converting the periodic electric signal into counting pulses, and the magnitude of the displacement is indicated by the number of pulses. The timing and phase relation of an angle disc in the incremental rotary encoder 410 is converted by two photosensitive receiving tubes inside, so that the angle displacement of the angle disc is increased (in the positive direction) or decreased (in the negative direction). The incremental rotary encoder is convenient to install, safe and long in service life.

The rotary encoder 410 is used for detecting the rotation angle, direction and speed information of the servo motor 320 in real time and feeding the detected motion information back to the FPGA control chip. If the FPGA control chip does not receive the rotation motion information of the cantilever 330 fed back from the rotary encoder 410, or the difference between the rotation angle, received by the FPGA control chip, of the cantilever 330 and an actual rotation angle is greater than 1°, the rotary encoder 410 has a fault, and in this case, the FPGA control chip drives the servo motor 320 to stop moving. The FPGA control chip monitors the rotary encoder 410 in real time to realize control to the servo motor 320, thereby greatly improving safety of the rotation motion module 30.

If receiving the rotation motion information of the cantilever 330, which is fed back from the rotary encoder 410, the FPGA control chip controls the trigger module to send a trigger instruction according to the rotation motion information of the cantilever 330, wherein the trigger instruction is a pulse signal. The trigger module 50 comprises a digital pulse drive chip connected with the FPGA control chip. When the cantilever 330 rotates by an angle α, the FPGA control chips controls the trigger module 50 to send a pulse signal used for acquiring human body information through scanning. Generally, the angle α is smaller than 1°. In this embodiment, the angle α is smaller than 0.5°. More detailed human body information can be acquired by decreasing the angle α. In actual operation, the angle α can be set according to actual requirements.

Figure 4:
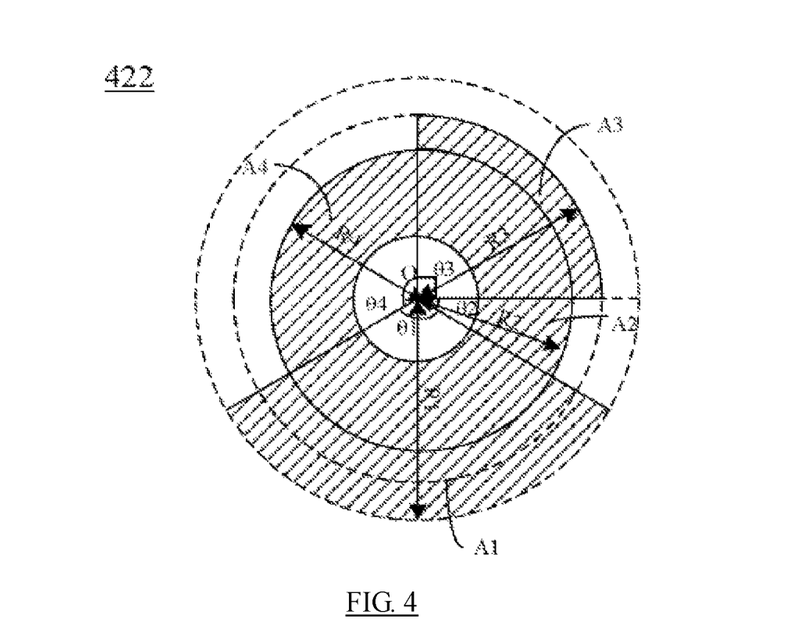
FIG. 4 is a structural view of a positioning sheet.

The positioning unit 420 comprises a positioning sheet 422. FIG. 4 is a structural view of the positioning sheet. As shown in FIG. 4, the positioning sheet 422 comprises a first sector ring A1, a second sector ring A2, a third sector ring A3 and a fourth sector ring A4 which are annularly connected in an anticlockwise direction. In this embodiment, the first sector ring A1, the second sector ring A2, the third sector ring A3 and the fourth sector ring A4 are integrally formed and are located on the same horizontal plane. Wherein, circle centers O of the first sector ring A1, the second sector ring A2, the third sector ring A3 and the fourth sector ring A4 coincide. Central angles of the first sector ring A1, the second sector ring A2, the third sector ring A3 and the fourth sector ring A4 are respectively a first central angle $\theta_1$, a second central angle $\theta_2$, a third central angle $\theta_3$ and a fourth central angle $\theta_4$. Major radii of the first sector ring A1, the second sector ring A2, the third sector ring A3 and the fourth sector ring A4 are respectively a first radius R1, a second radius R2, a third radius R3 and a fourth radius R4.

Wherein, the first central angle $\theta_1$ is an obtuse angle and is equal to the maximum rotation angle θ of the cantilever 330 ($\theta_1=\theta$); the second central angle $\theta_2$ is an acute angle, and $\theta_2=90°-\theta/2$; the third central angle is a right angle, namely $\theta_3=90°$; and the fourth central angle is an obtuse angle, and $\theta_4=180°-\theta/2$. The first radius R1, the third radius R3 and the second radius R2 are gradually deceased, namely R1>R3>R2, and the second radius R2 is equal to the fourth radius R4, namely R2=R4.

Figure 5:
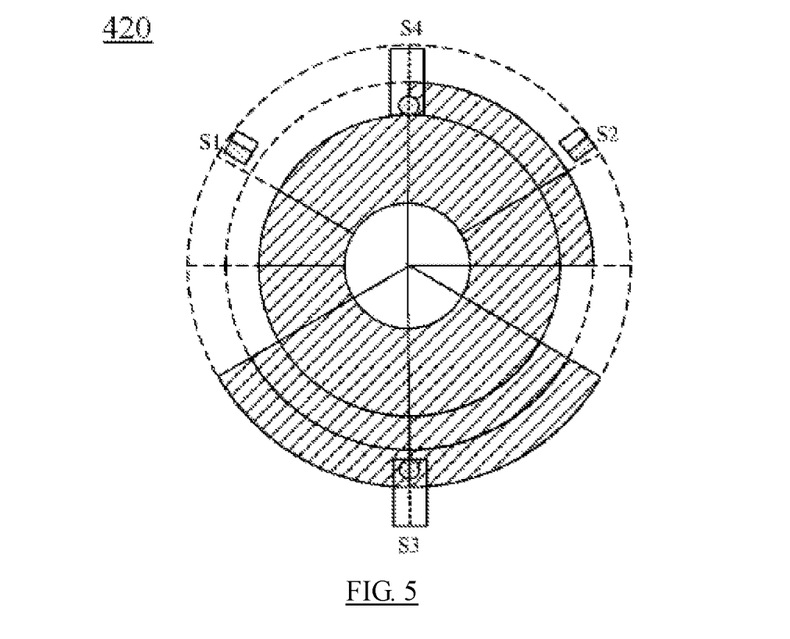
FIG. 5 is a structural view of the positioning detection module.

Referring to FIG. 5, the positioning unit 420 further comprises a first protection switch S1, a second protection switch S2, a null switch S3 and an intermediate switch S4. The null switch S3 is arranged on the midpoint of an arc of the first sector ring A1, and the distance from the null switch S3 to the circle center O is smaller than the first radius R1 and is greater than the third radius R3. A connecting line between the intermediate switch S4 and the null switch S3 penetrates through the circle center O, and the intermediate switch S4 is arranged at the joint between the third sector ring A3 and the fourth sector ring A4. The distance from the intermediate switch S4 to the circle center O is greater than the second radius R2 and smaller than the third radius R3. The first protection switch S1, the second protection switch S2 and the null switch S3 are located on the same circumference. A fifth central angle $\theta_5$ defined by the first protection switch S1, the circle center O and the null switch S3 and a sixth central angle $\theta_6$ defined by the second protection switch S2, the circle center O and the null switch S3 are equal to the first central angle $\theta_1$.

In this embodiment, the null switch S3 and the intermediate switch S4 are photoelectric sensor switches. The null switch S3 is used for determining left (clockwise rotation) and right (anticlockwise rotation) initial positions when the servo motor 320 controls the cantilever 330 to rotate.

In the operation process, the security check instrument motion control system receives an initialization instruction and a rotation instruction from the upper computer via the upper computer communication module 20, wherein the initialization instruction is, correcting the cantilever 330 according to the states of the null switch S3 and the intermediate switch S4, to enable the cantilever 330 to move to the left or right initial position. When the servo motor 320 drives the cantilever 330 to rotate clockwise or anticlockwise, the null switch S3 covered with the first sector ring A1 of the positioning sheet 422 is gradually exposed, and in this case, the cantilever 330 is located at the left initial position or the right initial position.

Figure 6A:
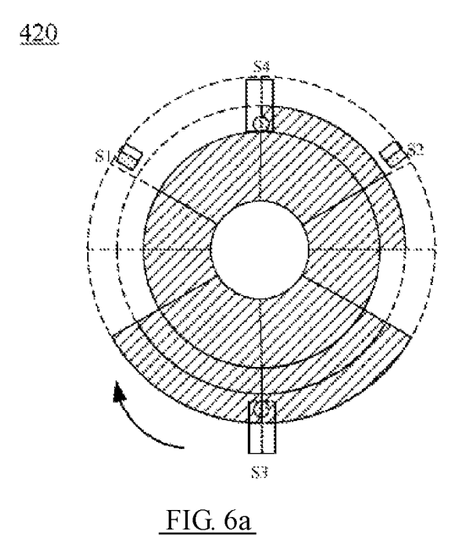
FIG. 6a is a structural view of the positioning detection module in a clockwise rotation state.
Figure 6B:
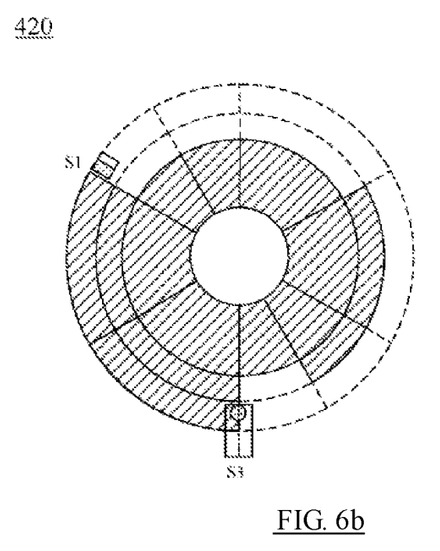
FIG. 6b is a structural view of a right null position of the positioning detection module.
Figure 7A:
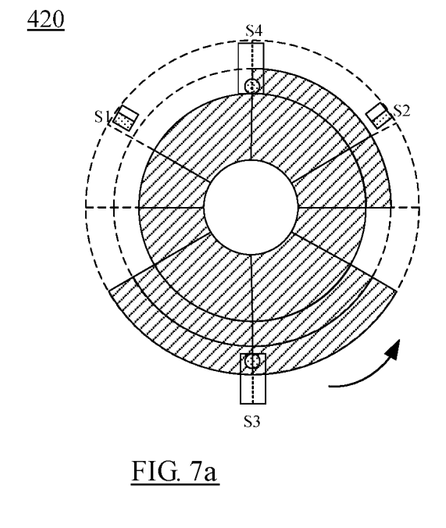
FIG. 7a is a structural view of the positioning detection module in the anticlockwise rotation state.
Figure 7B:
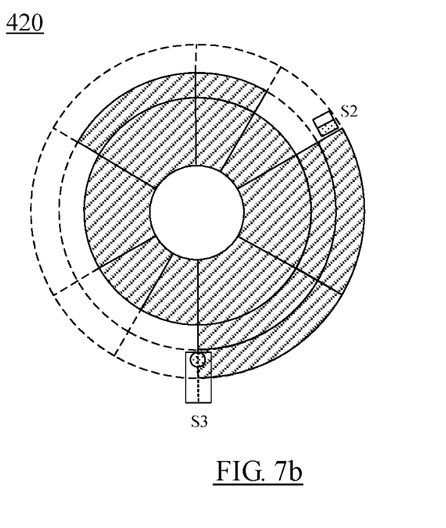
FIG. 7b is a structural view of a left null position of the positioning detection module.

The intermediate switch S4 is used for judging a moving direction in which the servo motor 320 drives the cantilever 330 to move to the initial position. Referring to FIG. 6a and FIG. 6b, if the intermediate switch S4 is covered with the third sector ring A3 of the positioning sheet 422 and the servo motor 320 rotates clockwise, in this case, the null switch S3 covered with the first sector ring A1 of the positioning sheet 422 is gradually exposed, and the cantilever 330 is located at the right initial position. Referring to FIG. 7a and FIG. 7b, if the intermediate switch S4 is covered with the third sector ring A3 of the positioning sheet 422 and the servo motor 320 rotates anticlockwise, in this case, the null switch S3 covered with the first sector ring A1 of the positioning sheet 422 is gradually exposed, and, the cantilever 330 is located at the left initial position.

When the security check instrument motion control system receives the rotation instruction from the upper computer via the upper computer communication module 20, the FPGA control chip controls the cantilever 330 to rotate to the left or right initial position to be matched with the positioning sheet 422, the null switch S3 and the intermediate switch S4. If the intermediate switch S4 is not covered with the third sector ring A3 of the positioning sheet 422, the servo motor 320 rotates anticlockwise to drive the cantilever 330 to rotate anticlockwise by an angle $\theta$. If the intermediate switch S4 is covered with the third sector ring A3 of the positioning sheet 422, the servo motor 320 rotates clockwise to drive the cantilever 330 to rotate clockwise by an angle $\theta$. Meanwhile, motion information of the cantilever 330 is monitored in real time by the rotary encoder 410. The positioning sheet 422 and the photoelectric sensor switches are combined in the positioning detection module 40 to achieve positioning, so that a traditional method for determining the initial positions through an encoder is replaced, and the cost is greatly reduced.

In this embodiment, the first protection switch S1 and the second protection switch S2 are mechanical switches, and the fifth central angle $\theta 5$ defined by the first protection switch S1, the circle center O and the null switch S3 and the sixth central angle $\theta 6$ defined by the second protection switch S2, the circle center O and the null switch S3 are equal to the first central angle $\theta$, namely the first protection switch S1 and the second protection switch S2 are separately located at extreme positions corresponding to the maximum rotation angle $\theta$ of the cantilever. When the null switch S3 has a fault, the first sector ring A1 of the positioning sheet 422 will rotate clockwise to touch the first protection switch S1 or rotate anticlockwise to touch the second protection switch S2, a power supply supplying power to the servo motor 320 will be cut off by the first protection switch S1 and the second protection switch S2, and the servo motor 320 stops moving, so that the cantilever 330 is protected against deformation or damage caused by collision; and meanwhile, fault information is fed back to the upper computer via the FPGA control chip.

The trigger module 50 comprises a digital pulse drive chip connected with the FPGA control chip. When the servo motor 320 rotates by an angle $\alpha$, the FPGA control chip controls the trigger module 50 to send a pulse signal used for acquiring human body information through scanning Generally, the angle $\alpha$ is smaller than 1°. In this embodiment, the angle $\alpha$ is smaller than 0.5°. More detailed human body information can be obtained by decreasing the angle $\alpha$. In practical operation, the angle $\alpha$ can be set according to actual requirements.

The rotation motion module 30 of the security check instrument motion control system is protected in the hardware aspect and the software aspect. In the hardware protection aspect, the first protection switch, the second protection switch and the positioning sheet 422 are used for powering off the servo motor 320, so that the cantilever 330 is protected against deformation or damage caused by collision when a fault happens. In the software protection aspect, the FPGA control chip monitors the motion information of the rotary encoder 410 and the null switch in real time to control the servo motor 320, thereby greatly improving the safety of the security check instrument motion control system.

The technical characteristics of the above embodiments can be combined freely. For the sake of a brief description, not all possible combinations of the technical characteristics of the above embodiments are described. All these combinations of the technical characteristics should also fall within the scope of the present disclosure.

The above embodiments are only several illustrative ones specifically described in detail, but are not intended to limit the patent scope of the present disclosure. What should be pointed out is that various transformations and improvements made by those ordinarily skilled in this field without deviating from the conception of the present disclosure also fall within the protection scope of the present disclosure.

What is claimed is:

1. A security check instrument motion control system, comprising an upper computer communication module, a main controller, a rotation motion module, a trigger module, a positioning detection module and a power module, wherein the upper computer communication module communicates with an upper computer;

the main controller is connected with the upper computer communication module, the rotation motion module, the trigger module and the positioning detection module respectively, receives motion instructions from the upper computer and drives and controls the rotation motion module to move;

the rotation motion module is mechanically connected with the positioning detection module, and the positioning detection module is used for detecting and judging motion information of the rotation motion module;

the main controller controls a motion state of the rotation motion module according to the motion information and controls the trigger module to acquire human body information through scanning;

the main controller is an FPGA control chip; and the power module supplies power to each said module in the security check instrument motion control system.

2. The security check instrument motion control system according to claim 1, wherein the rotation motion module comprises a driver, a servo motor and a cantilever;
the driver, the servo motor and the cantilever are sequentially connected, and the driver is used for driving the servo motor to drive the cantilever to rotate.

3. The security check instrument motion control system according to claim 2, wherein the positioning detection module comprises a rotary encoder and a positioning unit, and the rotary encoder and the positioning unit are coaxial with the servo motor;
the rotary encoder is used for detecting rotation angle, direction and speed information of the servo motor in real time;
the positioning unit is used for monitoring the clockwise or anticlockwise rotation of the initial and extreme position of the servo motor.

4. The security check instrument motion control system according to claim 3, wherein the rotary encoder is an incremental encoder with a resolution smaller than or equal to 0.005°.

5. The security check instrument motion control system according to claim 3, wherein the positioning unit comprises a positioning sheet, the positioning sheet comprises a first sector ring, a second sector ring, a third sector ring and a fourth sector ring which are annularly connected in an anticlockwise direction, and circle centers of the first sector ring, the second sector ring, the third sector ring and the fourth sector ring coincide;
central angles of the first sector ring, the second sector ring, the third sector ring and the fourth sector ring are respectively a first central angle, a second central angle, a third central angle and a fourth central angle;
major radii of the first sector ring, the second sector ring, the third sector ring and the fourth sector ring are respectively a first radius, a second radius, a third radius and a fourth radius;
the first central angle is an obtuse angle, the second central angle is an acute angle, the third central angle is a right angle, and the fourth central angle is an obtuse angle;
the first radius, the third radius and the second radius are gradually decreased, and the second radius is equal to the fourth radius.

6. The security check instrument motion control system according to claim 5, wherein the positioning unit further comprises a first protection switch, a second protection switch, a null switch and an intermediate switch;
the null switch is arranged on a midpoint of an arch of the first sector ring, and a distance from the null switch to the circle center is smaller than the first radius and greater than the third radius;
a connecting line between the intermediate switch and the null switch penetrates through the circle center and is located at a joint between the third sector ring and the fourth sector ring; a distance from the intermediate switch to the circle center is greater than the second radius and smaller than the third radius;
the first protection switch, the second protection switch and the null switch are located on a same circumference;
a fifth central angle defined by the first protection switch, the circle center and the null switch and a sixth central angle defined by the second protection switch, the circle center and the null switch are equal to the first central angle.

7. The security check instrument motion control system according to claim 6, wherein the first protection switch and the second protection switch are mechanical switches.

8. The security check instrument motion control system according to claim 6, wherein the null switch and the intermediate switch are photoelectric sensor switches.

9. The security check instrument motion control system according to claim 1, wherein the trigger module comprises a digital pulse drive chip connected with the FPGA control chip.

10. The security check instrument motion control system according to claim 1, wherein the upper computer communication module comprises an mbps ethernet port communication chip, the mbps ethernet port communication chip is connected with the upper computer, to be used for communication with the upper computer.

* * * * *